Figure 1:
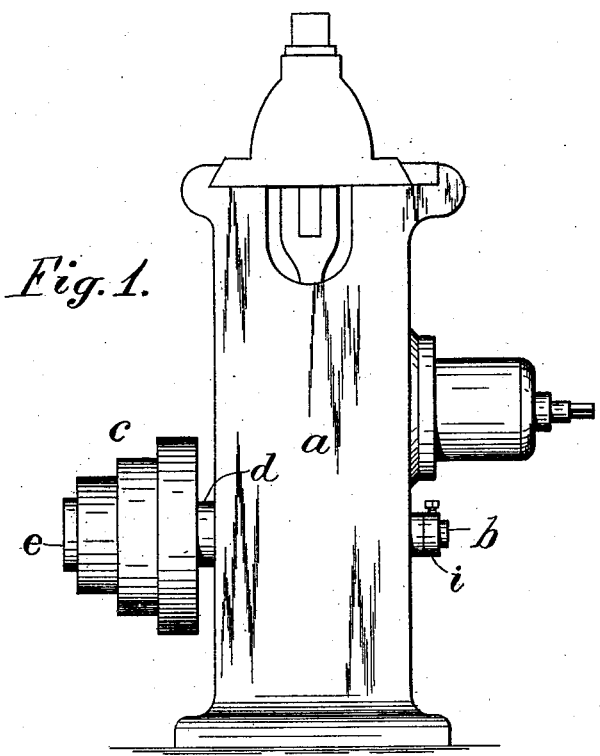

No. 712,273. Patented Oct. 28, 1902.
H. E. EBERHARDT.
SHAFT DRIVER.
(Application filed Feb. 1, 1902.)

(No Model.)

Attest:
L. Lee.
Walter H. Talmage.

Inventor
Henry E. Eberhardt,
per Thos. S. Crane, Atty.

UNITED STATES PATENT OFFICE.

HENRY E. EBERHARDT, OF NEWARK, NEW JERSEY, ASSIGNOR TO GOULD & EBERHARDT, OF NEWARK, NEW JERSEY, A CORPORATION OF NEW JERSEY.

SHAFT-DRIVER.

SPECIFICATION forming part of Letters Patent No. 712,273, dated October 28, 1902.

Application filed February 1, 1902. Serial No. 92,153. (No model.)

*To all whom it may concern:*

Be it known that I, HENRY E. EBERHARDT, a citizen of the United States, residing at 84 Elm street, Newark, county of Essex, State of New Jersey, have invented certain new and useful Improvements in Shaft-Drivers, fully described and represented in the following specification and the accompanying drawings, forming a part of the same.

The object of the present invention is to furnish a means of applying the power to the driven shaft of various machines without any lateral strain upon such shaft to cause wear of the bearing of such driven shaft where the power is applied, and such result is attained by providing the shaft with an overhung bearing having its exterior concentric with the shaft and applying a driving pulley-wheel or gear-wheel to the exterior of such bearing and connecting a collar upon the shaft with the hub of the wheel by a series of projections which connect the hub and shaft upon different sides of the latter, so as to transmit the power at a number of points simultaneously. Such distribution of motion and power exists in various detachable clutches having a series of teeth, but has not, so far as I am aware, ever been applied to permanently connect a shaft with a hub which is separated from it by an intermediate bearing. Where the wheel and shaft are thus separated, a collar is required to extend from the shaft to the hub of the wheel and projections to engage the hub with the shaft through the agency of such collar. The connection of the parts is designed to be permanent to drive the shaft continuously when the wheel is rotated, and the engagement is designed to be free from lost motion, so that any mechanism connected with the shaft may be driven without jar or vibrations. Such results are obtained very cheaply by employing a series of pins projected from the collar at various points into holes upon the pulley-hub formed parallel with the shaft. Such holes and pins are readily made, and the shaft is thus driven from various sides simultaneously without lateral thrust upon the shaft. Lost motion can be prevented when desired by forming the pins to fit snugly in the holes, and the pulley is thus enabled in all positions to drive the shaft without lost motion and may turn the shaft in reverse directions, if required, with a perfectly equable movement. To confine the oil to the bearing, a cap may be applied over the collar and secured upon the hub of the pulley.

The invention will be understood by reference to the annexed drawings, in which—

Figure 3:
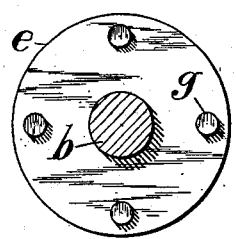
Figure 4:
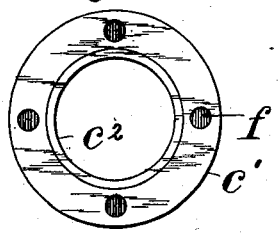
Figure 2:
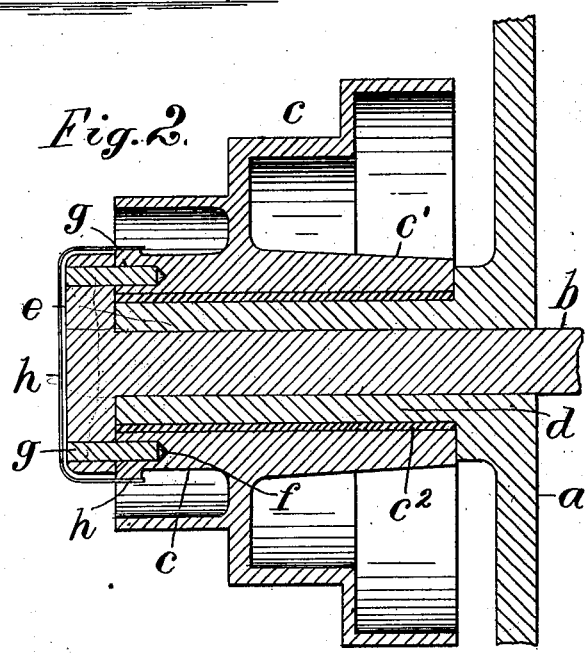

Figure 1 is an end view of a shaping-machine with the invention applied to its driving-pulley. Fig. 2 is a section of the pulley and the shaft-bearing adjacent thereto. Fig. 3 is an end view of the collar and shaft, and Fig. 4 is an end view of the pulley-hub.

$a$ designates the frame of the machine, and $b$ the shaft for driving the machine, which is a driven shaft in relation to the pulley $c$. The pulley is fitted to the exterior of an overhung bearing $d$, which is projected from the outside of the frame $a$ sufficiently to receive the hub $c'$ of the pulley. The exterior of the bearing is concentric, so that the pulley sets at right angles to the shaft. A collar $e$ is shown upon the end of the shaft of such a diameter as to extend beyond the exterior of the bearing past the end of the pulley-hub, and the collar thus serves to hold the pulley upon the bearing. A series of cylindrical holes $f$ are shown formed in the end of the pulley-hub parallel with the shaft or with the bore of the pulley, and a series of corresponding pins $g$ is shown projected from the inner face of the collar and fitted snugly to such holes. The pins engage the collar with the hub of the pulley, so that the rotation of the pulley drives the shaft by a connection which is practically central in its torsional effect, as all the sides of the collar are turned at the same time and the shaft is rotated without any lateral thrust.

The usual draft of the driving-belt upon the pulley is sustained entirely by the exterior of the bearing $d$, and such strain has therefore no tendency to wear the interior of the bearing, to which the shaft is fitted. The bearing for the shaft is thus rendered much more durable and the shaft is enabled to retain its adjusted position in relation to the other parts of the mechanism for a much greater length of time. It is well known that when a gear-wheel is driven by another gear at one side of the same a lateral thrust is produced upon the bearing of the driven wheel, and the present invention is equally applicable to a toothed wheel arranged in the place of the pulley-wheel shown and transmitting the power to the shaft $b$ by the same means.

I have used the term "driving-wheel" in the claims to include either a pulley or a toothed wheel.

In the present invention the shaft is parallel with the bore of the pulley, and the pulley revolves at right angles to the shaft, and the holes in the hub of the pulley may therefore be made parallel with the shaft as well as the pins which fit such holes, and such construction enables the parts to be accurately fitted and one to drive the other without any lost motion. Any projections parallel with the shaft would serve to connect the collar and the hub of the wheel, with the same result as the cylindrical pins fitted to cylindrical holes, and I do not, therefore, limit myself to a cylindrical form for the projections.

Fig. 2 shows a cap $h$ inclosing the collar and secured upon the end of the wheel-hub $c$ to prevent the oil which escapes from the bearing from flying outwardly. The cap is of cup shape to embrace the collar and is fitted tightly upon the hub to retain any oil that may escape from the bearing between the same and the collar. The cap is shown of thin metal to spring elastically upon the pulley, so that it can be removed at pleasure for cleaning out the oil. The shaft is shown extended through the machine-frame $a$, with a set-screw collar at its opposite end to prevent longitudinal movement, and the collar $e$ thus serves to hold the wheel $c$ upon the bearing $d$. The collar is shown integral with the shaft $d$; but this is not essential to its operation, provided it is constructed to revolve with the shaft; but in any case it performs the double function of holding the driving-wheel upon its bearing and of transmitting the power of the wheel to the shaft. It is obvious that the shaft may be used as the driver to transmit motion to the wheel without any lateral strain being exerted upon the shaft, the thrust of the wheel exerted in transmitting the motion to other points being wholly sustained by the outside of the bearing. A sleeve $c^2$ is shown upon the outer surface of the bearing to be renewed and made concentric with the shaft $b$ if it becomes worn laterally by the pressure of the revolving wheel.

I am aware that it is common to support the lateral strain upon a driving-wheel—as, for instance, a belt-pulley—by making the pulley or driving-wheel hollow and supporting an auxiliary bearing in contact with the hub of the pulley or of its shaft in the line of the lateral strain. Roller-bearings have also been located in or adjacent to the line of and adapted to resist the lateral strain of a belt used to rotate a pulley and spindle. My invention furnishes a substitute for these constructions; but it is obvious that where it is desired such auxiliary support may be given to the hub of the pulley or driving wheel where it is possible to make the same hollow, as shown in Fig. 2 of my drawings. In this figure the cylindrical hub of the pulley extends within the shell of the pulley sufficiently to apply an auxiliary bearing to the exterior of the hub and to support such bearing upon the frame-plate $a$.

As my invention is applied to the end of the hub, it does not therefore interfere with the application of an auxiliary bearing to one side of the hub $c'$, where it may be desired to support a very heavy strain, such auxiliary bearing being supported upon the frame-plate $a$ in a manner already well known.

Having thus set forth the nature of the invention, what is claimed herein is—

1. In a shaft-driver, the combination, with a stationary frame having an overhung cylindrical bearing with its exterior and interior concentric, of a shaft fitted within such bearing, a driving-wheel having hub fitted to the exterior of the bearing to turn thereon at right angles to the shaft, a collar revolving with the shaft, and a series of projections for engaging the collar and the hub of the driving-wheel whereby the shaft may be driven without lateral thrust upon the same, substantially as herein set forth.

2. In a shaft-driver, the combination, with a stationary frame having an overhung cylindrical bearing with its exterior and interior concentric, of a shaft fitted within such bearing, a driving-wheel having hub fitted to the exterior of the bearing to turn thereon at right angles to the shaft, a collar upon the end of the shaft, projections for engaging the collar and the hub of the driving-wheel, and a cap inclosing the collar and attached to the hub of the driving-wheel to confine the oil, substantially as herein set forth.

3. In a shaft-driver, the combination, with a stationary frame having an overhung cylindrical bearing with its exterior and interior concentric, of a shaft fitted within such bearing, a driving-wheel having hub fitted to the exterior of the bearing to turn thereon at right angles to the shaft, a collar upon the end of the shaft extended beyond the periphery of the bearing by the side of the wheel-hub, a series of projections parallel with the shaft to engage such collar and hub, and the driving-wheel retained upon the bearing by the collar, substantially as herein set forth.

4. In a shaft-driver, the combination, with a driven shaft, of a stationary frame having an overhung bearing fitted to the shaft with periphery concentric with the shaft, a driving-wheel having hub fitted to the periphery of the bearing to turn thereon at right angles to the shaft, and having cylindrical holes in the outer end of its hub parallel with the shaft, a collar upon the end of the shaft extended beyond the periphery of the bearing by the side of the wheel-hub, and a series of cylindrical pins projected from the collar into the holes of the hub and fitted snugly thereto, whereby the driving-wheel in every position (or with reverse movements) may drive the shaft without lost motion, substantially as herein set forth.

5. In a shaft-driver, the combination, with a stationary frame having an overhung cylindrical bearing with its exterior and interior concentric, of a shaft fitted within such bearing, a driving-wheel having hub fitted to the exterior of the bearing to turn thereon at right angles to the shaft, a collar revolving with the shaft, a series of projections for engaging the collar and the hub of the driving-wheel, and a sleeve secured upon the exterior of the bearing to restore its concentric surface when worn by the wheel.

In testimony whereof I have hereunto set my hand in the presence of two subscribing witnesses.

HENRY E. EBERHARDT.

Witnesses:
THOMAS S. CRANE,
FRED L. EBERHARDT.